(12) United States Patent
Nelson

(10) Patent No.: US 9,456,598 B1
(45) Date of Patent: Oct. 4, 2016

(54) MOBILE HUNTING PLATFORM

(71) Applicant: Donald Clinton Nelson, Cedar Bluff, VA (US)

(72) Inventor: Donald Clinton Nelson, Cedar Bluff, VA (US)

( * ) Notice: Subject to any disclaimer, the term of this patent is extended or adjusted under 35 U.S.C. 154(b) by 0 days.

(21) Appl. No.: 14/463,934

(22) Filed: Aug. 20, 2014

(51) Int. Cl.
*A01M 31/02* (2006.01)
*B62B 1/00* (2006.01)
*B62B 11/00* (2006.01)

(52) U.S. Cl.
CPC .............. *A01M 31/02* (2013.01); *B62B 1/00* (2013.01); *B62B 11/00* (2013.01)

(58) Field of Classification Search
CPC ........ A01M 31/02; E06C 1/39; E06C 1/393; B62B 1/12; B62B 11/00; B62B 1/00
USPC .................................................. 182/20, 187
See application file for complete search history.

(56) References Cited

U.S. PATENT DOCUMENTS

| | | | |
|---|---|---|---|
| 4,017,091 A * | 4/1977 | Wallen | A63B 55/60 280/30 |
| 5,265,780 A * | 11/1993 | Matthews et al. | 224/155 |
| 5,433,291 A | 7/1995 | Shoestock, Sr. | |
| 5,492,196 A | 2/1996 | Michno | |
| 5,624,008 A * | 4/1997 | Beardslee, Jr. | 182/136 |
| 6,481,529 B1 * | 11/2002 | Voorhies | 182/20 |
| 7,849,964 B2 | 12/2010 | Amacker et al. | |
| 7,967,325 B1 | 6/2011 | Burton et al. | |
| 8,205,626 B2 * | 6/2012 | Myers | 135/90 |
| 8,500,141 B2 | 8/2013 | Chase | |
| 9,137,982 B2 * | 9/2015 | Yoder | A01M 31/006 |
| 2003/0024559 A1 * | 2/2003 | Fields | 135/90 |
| 2004/0140158 A1 * | 7/2004 | Wilcox et al. | 182/187 |
| 2004/0222040 A1 | 11/2004 | Zirk | |
| 2006/0207831 A1 | 9/2006 | Moore et al. | |
| 2007/0256892 A1 * | 11/2007 | Breedlove, Sr. | 182/116 |

* cited by examiner

*Primary Examiner* — Charles A Fox
*Assistant Examiner* — Kristine Florio
(74) *Attorney, Agent, or Firm* — Matthew M. Googe; Robinson IP Law, PLLC

(57) ABSTRACT

A mobile hunting platform is provided for supporting a user in a tree. The mobile hunting platform includes a pair of wheels removably secured to an axle, a first platform comprising a first platform frame, a first jaw secured to the first platform for engaging the trunk of the tree, and a floor structure for supporting feet of the user, the floor structure shaped to receive at least one of the pair of wheels such that the at least one wheel forms a portion of the floor structure, and a second platform comprising a second platform frame, a second jaw secured to the second platform for engaging a trunk of the tree. The platform is reconfigurable from a first configuration as a cart, to a second configuration such that the mobile hunting platform is engaged with the trunk of the tree.

15 Claims, 9 Drawing Sheets

MOBILE HUNTING PLATFORM

FIELD

This disclosure relates to the field of observation platforms such as tree stands for hunting. More particularly, this disclosure relates to a portable observation platform that is convertible to a cart.

BACKGROUND

Hunting platforms such as tree stands are typically used to maintain a user at a desired height in a tree, preferably to give the user a useful vantage point for observation and hunting of game. Among various available hunting platforms, one particular configuration is a "climber" tree stand that includes two separates frame portions for supporting a user in a tree. The "climber" tree stand engages a trunk of the tree and allows a user to climb the tree using the two separate frame portions.

While a climber tree stand advantageously allows a user to climb a tree, the climber stands are typically cumbersome to transport. Specifically, the climber tree stand's multiple parts may be heavy and therefore difficult to carry by a user. The multiple parts of the climber tree stand may also be difficult to secure to one another for carrying by a user.

While attempts have been made to create a portable climbing tree stand, these efforts have resulted in the stand becoming heavier and more complex. For example, in some embodiments wheels have been added to existing climber tree stands to make the stands more portable, such as by converting the climber tree stand into a cart. However, the wheels may obstruct the user's view when the climber tree stand is deployed in the tree or may be otherwise difficult to stow when the wheels are not in use.

What is needed, therefore, is a mobile hunting platform that is readily convertible from a portable configuration to a deployed configuration such that components of the portable configuration are substantially integrated into the deployed configuration.

SUMMARY

The above and other needs are met by a mobile hunting platform for supporting a user in a tree. The mobile hunting platform includes a pair of wheels removably connected to an axle, a first platform comprising a first platform frame, a first jaw connected to the first platform frame for engaging the trunk of a tree, and a floor structure connected to the first platform frame for supporting feet of the user, the floor structure shaped to receive at least one of the pair of wheels removably connected to the axle such that the at least one wheel forms a portion of the floor structure, and a second platform comprising a second platform frame and a second jaw connected to the second platform frame for engaging a trunk of said tree. The mobile hunting platform is reconfigurable from a first configuration wherein the wheels are connected to the axle and the second platform is joined to the first platform to form a cart, to a second configuration wherein the wheels are removed from the axle and at least one of the wheels is connected to the floor structure of the first platform when the mobile hunting platform is engaged with the trunk of said tree.

In one embodiment, the axle is connected to the second platform. In another embodiment, the second platform further comprises a tray connected to the second platform frame at a distal end of the second platform relative to the second jaw. In yet another embodiment, the tray includes an edge such that a gap is created between the edge of the tray and the axle connected to the second platform.

In one embodiment, the first platform and the second platform are interlocked such that the first platform and second platform are connected to each other when the mobile hunting platform is in the first configuration to form a cart. In another embodiment, the gap between the edge of the tray and the axle is sized to receive the first jaw wherein the first jaw engages the gap of the second platform to substantially interlock the first platform and second platform together.

In yet another embodiment, the floor structure further comprises a plurality of elongate slats attached to the second platform frame. In one embodiment, the plurality of elongate slats are substantially parallel to one another and extend horizontally across the second platform frame.

In another embodiment, the pair of wheels are connected to the floor structure of the first platform. In yet another embodiment, a first wheel of the pair of wheels is connected to the floor structure of the first platform, and wherein a second wheel of the pair of wheels is connected to the second platform. In one embodiment, the second wheel secured to the second platform is connected to the second platform frame such that the second wheel forms a seat for supporting the user.

In another embodiment, the first platform further comprises a first platform cable connected to the first platform frame and configured to substantially contact the tree such that the first platform cable and first jaw engage the tree for supporting the first platform in the tree.

In yet another embodiment, the mobile hunting platform includes a tether secured to the first platform at a first end and the second platform at a second end for securing the first platform and second platform together. In one embodiment, the mobile hunting platform includes a pack, wherein the pack is sized to receive the first platform and second platform, the pack further comprising a pair of shoulder straps for engaging a user's shoulders such that the user may carry the mobile hunting apparatus as a backpack.

In another aspect, embodiments of the disclosure provide a mobile hunting platform for supporting a user in a tree. The mobile hunting platform includes a pair of wheels removably connected to an axle, a first platform comprising a first platform frame, a first jaw connected to the first platform frame for engaging the trunk of a tree, and a floor structure connected to the first platform frame for supporting feet of the user, the floor structure shaped to receive at least one of the pair of wheels removably connected to the axle such that the at least one wheel forms a portion of the floor structure, and a second platform comprising a second platform frame, a second jaw connected to the second platform for engaging a trunk of the tree, the second platform further comprising a tray connected to the second platform frame at a distal end of the second platform relative to the second jaw. The axle is connected to the second platform adjacent the tray such that a gap is formed between an edge of the tray and the axle. The mobile hunting platform is reconfigurable from a first configuration such that the pair of wheels are connected to the axle and the second platform is joined to the first platform to form a cart, to a second configuration such that the wheels are removed from the axle and at least one of the wheels is secured to the floor structure of the first platform when the mobile hunting platform is engaged with the trunk of the tree.

In yet another aspect, embodiments of the disclosure provide a method of converting a mobile hunting platform between a climbing tree stand to a cart. The method includes providing a climbing tree stand comprising a first platform and a second platform, each of the first platform and second platform including a jaw and a platform frame, providing a pair of wheels connected to a floor structure of the first platform, inserting the jaw of the first platform into a into a portion of the second platform such that the first platform and second platform are substantially interlocked, and removing the pair of wheels from the floor structure of the first platform and securing the pair of wheels to an axle of the mobile hunting platform.

In one embodiment, the jaw of the first platform is inserted into a gap between an edge of a tray of the second platform and the axle secured to the second platform.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Figure 1:
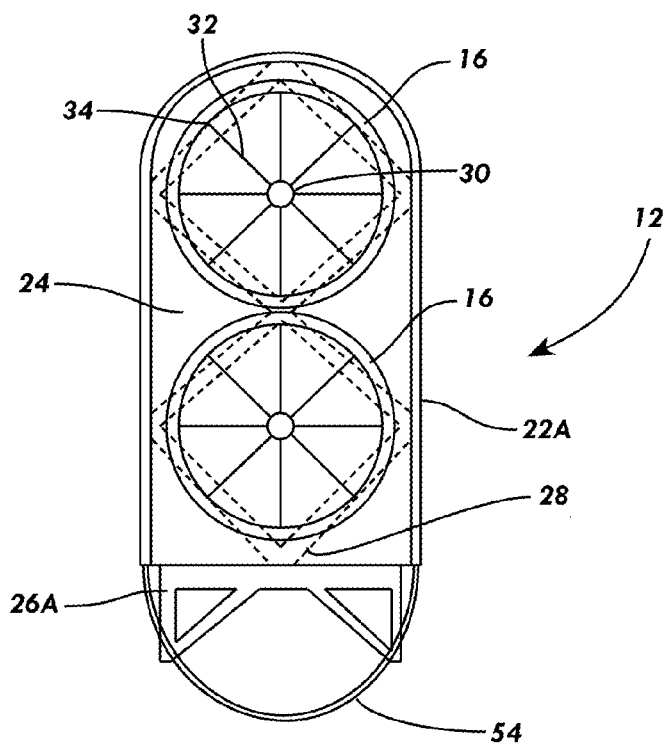
FIG. 1 shows a top view of a first platform of a mobile hunting platform according to one embodiment of the disclosure.
Figure 2:
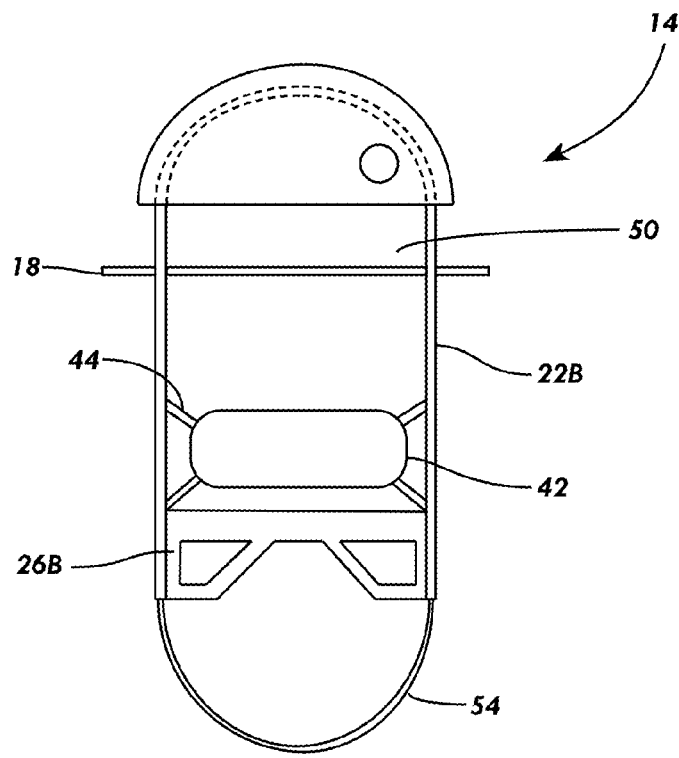
FIG. 2 shows a top view of a second platform of a mobile hunting platform according to one embodiment of the disclosure.
Figure 3:
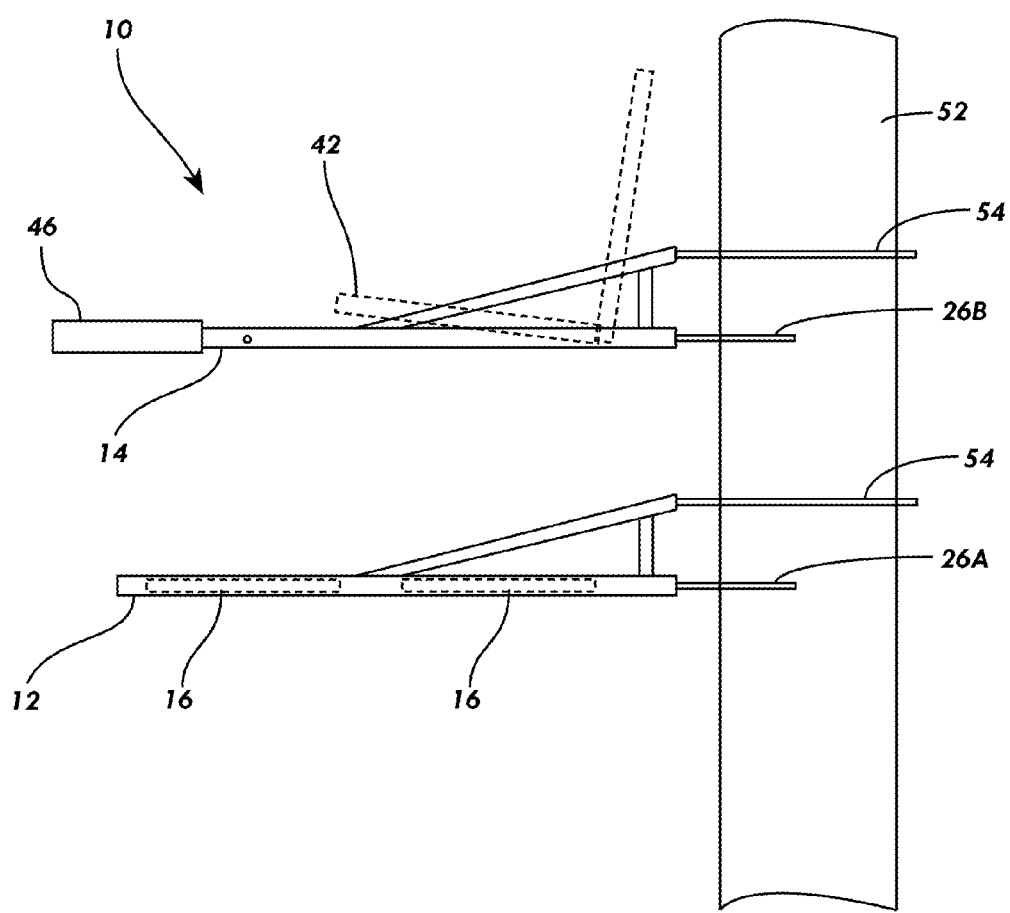
FIG. 3 shows a side view of a mobile hunting platform secured to a tree according to one embodiment of the disclosure.
Figure 4:
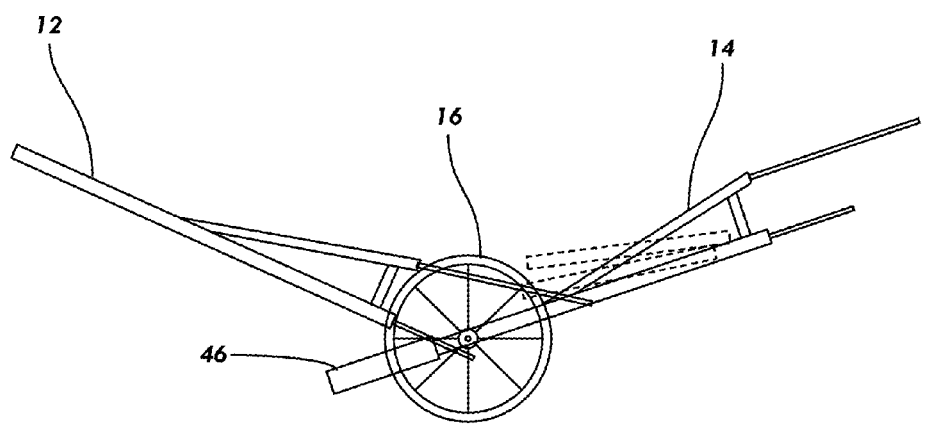
FIG. 4 shows a side view of a mobile hunting platform configured as a cart according to one embodiment of the disclosure.

FIGS. 1, 2 and 3 show a basic embodiment of a mobile hunting platform 10 that includes a first platform 12, a second platform 14, a pair of wheels 16, and an axle 18. The mobile hunting platform 10 is configurable as either a hunting platform engaged with a columnar object (FIG. 3), such as a tree, or as a mobile cart when the pair of wheels 16 is secured to the axle 18 (FIG. 4). When the mobile hunting platform 10 is configured as a hunting platform, at least one of the pair of wheels 16 forms a portion of a flooring structure 24 of the hunting platform 10.

With further reference to FIG. 1, the first platform 12 includes a frame 22A, the floor structure 24, and a jaw 26A secured to the frame for engaging a tree. The first platform 12 is configured to act as a foot support and standing platform for a user of the mobile hunting platform 10. The first platform 12 is capable of supporting a weight of the user when a user is standing on the first platform 12 during either climbing of a tree with the platform 10 or for standing on the first platform 12 while positioned in a tree during observation or hunting.

The frame 22A is preferably formed of a plurality of tubular frame members, such as steel, aluminum, or composite tubing, that are attached to one another, such as with fasteners or welding. While it is understood that the frame is preferably formed of tubular frame members, it is also understood that the frame may be formed of substantially rectangular or other polygonal shaped frame members joined to one another. It is also understood that the frame 22A may be substantially formed or molded of a single piece of material, such as a carbon fiber or polymer composite to reduce weight and the need for welding or fasteners to join individual frame elements together.

The floor structure 24 is preferably formed of a plurality of elongate floor members 28 secured at either end to the frame 22A. The elongate floor members 28 may be secured to the frame 22A at either end by fasteners or by welding the elongate floor members 28 to the frame 22A. The floor members 28 are positioned to support at least one of the wheels 16 in a substantially horizontal position such that the at least one wheel 16 thereafter forms a portion of the floor structure 24. By forming a portion of the floor structure 24, the wheel 16 is secured to and supported by the floor members 28 such that the user may stand on at least a portion of the wheel 16 such that the wheel 16 supports the user. Further, the position of the wheel 16 as part of the floor structure 24 does not obstruct movement of the user. Also, unlike other similar products on the market that may include a pair of wheels, the user does not have to leave the wheel 16 at a base of the tree when the user climbs the tree with the mobile hunting platform 10. The wheel 16 may be secured to the elongate floor members 28 with straps, fasteners, or other means of securing the wheel 16 to the elongate floor members such that the wheel 16 does not move when supporting the user.

To support all or a portion of a weight of the user, the wheel 16 includes a hub 30 and spokes 32 extending radially from the hub 30 to a rim 34 of the wheel 16. Preferably the hub 30, spokes 32, and rim 34 may be formed of steel, aluminum, carbon fiber composite or polymer material such that the wheel 16 may support all or a portion of the user's weight. The spokes 32 are preferably spaced apart close enough that the user may stand on or be supported by the spokes 32 without a foot of the user slipping between the spokes 32 when the user stands on the wheel 16.

While the above description contemplates the wheel 16 supporting all or a portion of the user's weight, it is also understood that at least one of the pair of wheels 16 may be secured to the elongate floor members 28 to form a portion of the floor structure 24 without supporting all or a portion of the user's weight. For example, at least one of the pair of wheels 16 may be strapped or fastened to an underside of the elongate floor members 28 such that the at least one wheel 16 is supported by and secured to the floor structure 24 while the weight of the user may be supported by the one or more elongate floor members 28.

Figure 5:
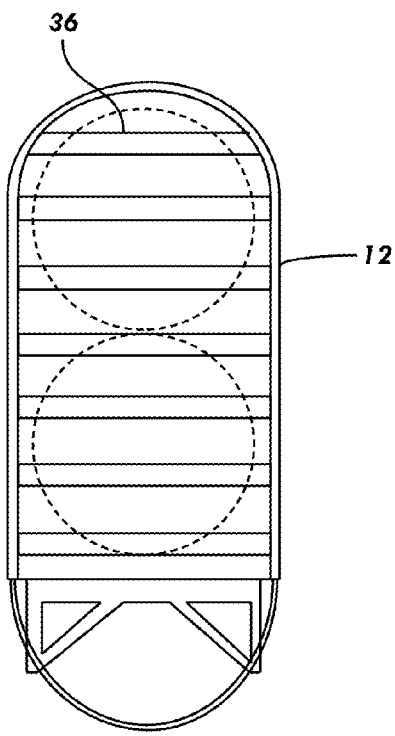
FIGS. 5 and 6 show a top view of various floor structures of a first platform of a mobile hunting platform according to embodiments of the present disclosure.
Figure 6:
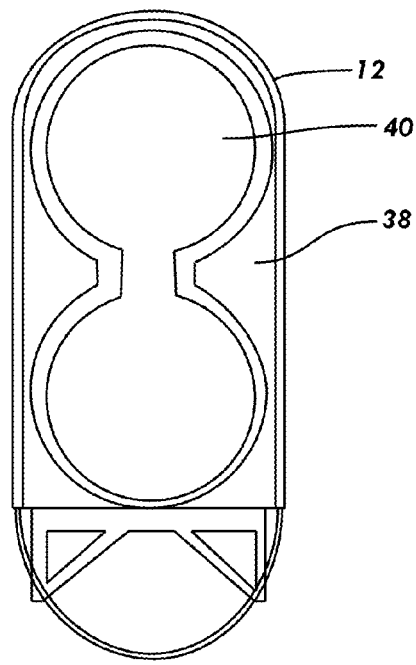

Referring now to FIGS. 5 and 6, the floor members 28 may be formed of a variety of configurations for engaging at least one of the pair of wheels 16. For example, the floor members 28 may be formed of a plurality of elongate parallel slats 36 (FIG. 5) secured at either end to the frame 22. Alternatively, the floor structure 24 may be formed of a substantially solid surface 38 that includes one or more cutouts 40 shaped to receive at least one of the pair of wheels 16. The surface 38 may be formed of a wire mesh or solid metal or polymer material for supporting the user.

The second platform 14 includes a frame 22B and jaw 26B, as shown in FIG. 2, that are substantially similar to the frame 22A and jaw 26A of the first platform. The second platform 14 is configured to act as a support for a seat 42 for the user to sit down while the user's feet are supported by the first platform 12. The seat 42 may be supported from the frame 22B of the second platform 14 by one or more seat straps 44 to suspend the seat 42 from the frame 22B.

The axle 18 of the mobile hunting platform 10 is preferably secured to the frame 22B of the second platform 14 and extends from the frame 22 to provide a mounting point for the pair of wheels 16. The axle 18 is configured to receive the pair of wheels 16 such that the wheels 16 may be secured to the axle 18 when the hunting platform 10 is in a mobile cart configuration, as described in more detail below. The wheels 16 may be secured to the axle 18 with a cotter pin, quick release mechanism, or other known means for securing a wheel to an axle.

A tray 46 is secured to the frame 22B of the second platform 14 at a distal end of the second platform 14 relative to the jaw 26B. The tray 46 is oriented such that the user may rest objects on the tray 46 while seated in the seat 42 of the hunting platform 10. The tray 46 may also include a cup holder 48 formed therein for holding a beverage of the user. When the tray 46 is secured to the frame 22B of the second platform 14, a gap 50 is formed between an edge of the tray 46 and the axle 18 secured to the second platform 14 for receiving a portion of the first platform such that the first platform 12 interlocks with the second platform 14 as described below.

The mobile hunting platform 10 is configurable as a tree-mounted hunting platform, as illustrated in FIG. 3. When configured as a hunting platform, the mobile hunting platform 10 is mounted to and configured in a substantially similar manner as a typical climber style tree stand, wherein the user may use the separate first platform 12 and second platform 14 to "climb" the tree to a desired height. After reaching the desired height, the hunting platform 10 is then positioned such that the jaws 26A and B of the first platform 12 and second platform 14 are engaged with a surface of a tree 52. The mobile hunting platform 10 may further include a cable 54 or other like device to engage the tree 52 with the jaws 26 to maintain a position of the first platform 12 and second platforms 14 against the tree 52. An optional tether may be included that secures the first platform 12 to the second platform 14 such that if the user drops or otherwise loses control of the first platform 12 or second platforms 14, neither the first platform 12 or the second platform 14 falls to the ground.

When the mobile hunting platform 10 is configured as a platform installed on a tree, at least one of the pair of wheels 16, and preferably both wheels 16, are secured to the first platform 12 as part of the floor structure 24 such that the wheels 16 remain with the hunting platform 10 when the wheels 16 are not installed on the axle 18. The user is supported by sitting in the seat 42 including an optional seat back secured to the second platform 14 while the user may stand on the first platform 12 secured to the tree substantially parallel to the second platform 14.

Referring now to FIG. 4, the mobile hunting platform 10 is readily reconfigurable from the tree-mounted hunting-platform described above to a mobile cart 56 that allows the user to readily transport the hunting platform 10. When the mobile hunting platform is configured as the mobile cart 56 of FIG. 4, the cart is also capable of transporting heavy loads such as game killed by the hunter from the hunting platform 10. To configure the mobile hunting platform as a cart 56, the first platform 12 and second platforms 14 are first disengaged from the tree. After removing the first platform 12 and second platform 14 from the tree, the wheels 16 are removed from the first platform 14 and installed onto the axle 18 of the second platform 14.

Figure 7:
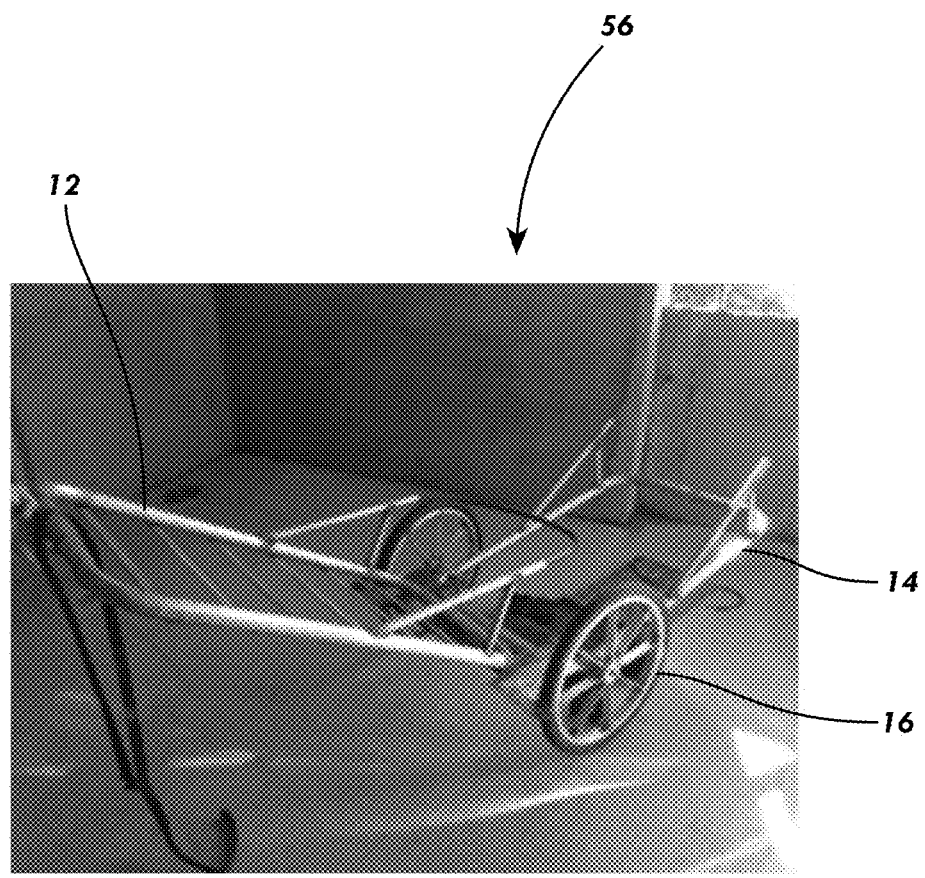
FIG. 7 shows a perspective view of a mobile hunting platform configured as a cart according to one embodiment of the disclosure.

The first platform 12 and second platform 14 are substantially interlocked with one another to secure the first platform 12 and second platform 14 together such for transportation and for carrying loads secured to the cart 56. The first platform 12 and second platform 14 may be substantially interlocked by inserting the jaw 26 of the first platform 12 into the gap 50 (FIG. 2) of the second platform 14 formed between the tray 46 and axle 18. After interlocking the first platform 12 and second platform 14, a strap or fastener may be secured to the first platform 12 and second platform 14 to hold the first platform 12 and second platform 14 together when transporting the mobile hunting platform 10. FIG. 7 shows another view of the mobile hunting platform when configured as a cart 56.

Figure 8:
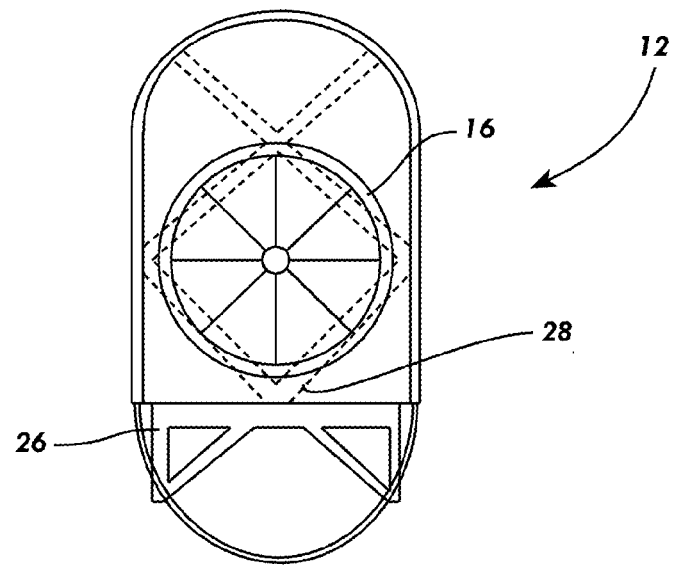
FIG. 8 shows a top view of a first platform of a mobile hunting platform according to one embodiment of the disclosure.
Figure 9:
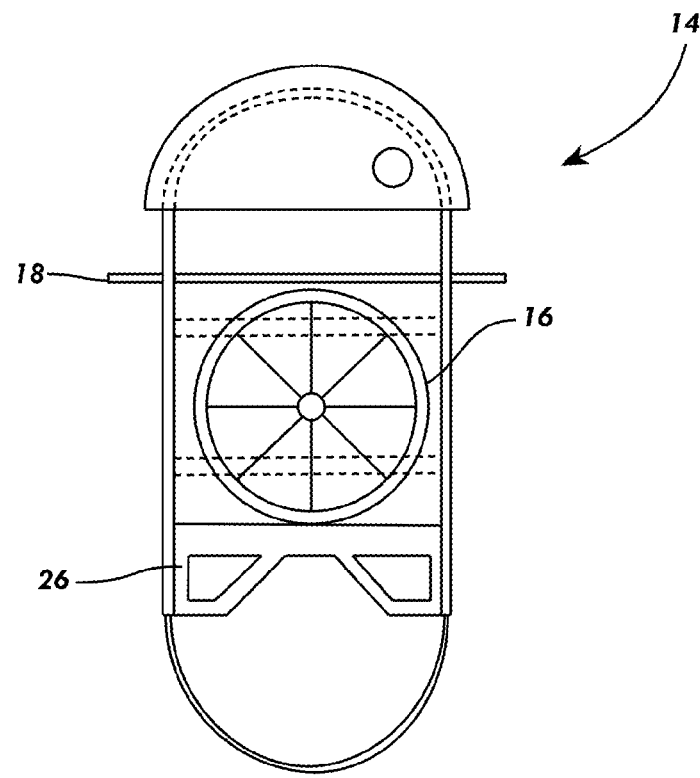
FIG. 9 shows a top view of a second platform of a mobile hunting platform according to one embodiment of the disclosure.

While the above description discloses a mobile hunting platform 10 wherein both wheels 16 are preferably secured to the first platform 12, it is also understood that the platform 10 may be configured such that one of the wheels 16 is secured to the floor structure 24 of the first platform and that the other wheel may be secured to the second platform 14, as illustrated in FIGS. 8 and 9. For example, one of the wheels 16 may be secured to the frame 12 of the second platform 14 such that the user may sit on the wheel 16 when the second platform 14 is secured to a tree, as shown in FIG. 9. An optional cushion may be provided for a user to sit on when one of the wheels 16 is secured to the second platform 14. By securing only one wheel to each of the first platform 12 and second platform 14, an overall length of each of the first platform 12 and second platform 14 may be decreased to reduce an overall weight of the mobile hunting platform 10.

Figure 10:
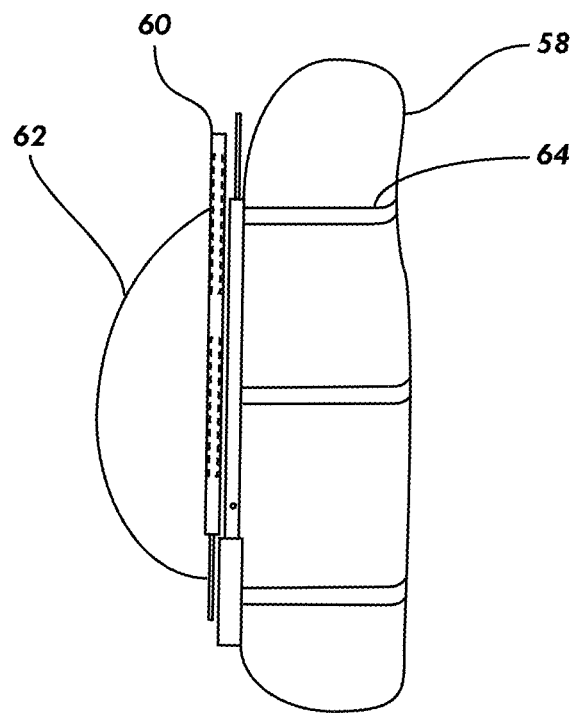
FIGS. 10-12 show a mobile hunting platform pack according to one embodiment of the present disclosure.
Figure 11:
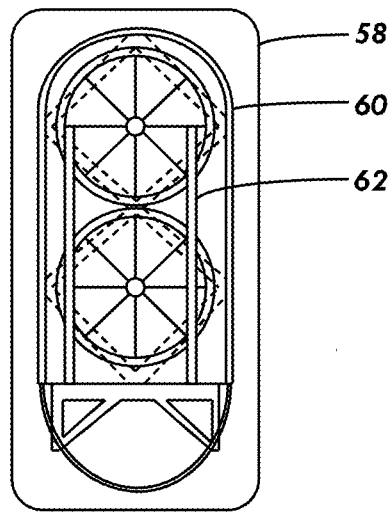

In other embodiments, portions of the mobile hunting platform 10 may be configured as a game cart, pack, backpack, or rolling carrier. For example, as illustrated in FIGS. 10 and 11, a pack 58 is formed that includes a pack frame 60 and one or more shoulder straps 62 for a user to carry the pack 58. Preferably, the pack 58 is formed of a canvas or other cloth material and is configured to receive the first platform 12 and second platform 14 of the mobile hunting platform 10. As shown in FIG. 10, the first platform 12 including the pair of wheels 16 is secured adjacent the second platform 14. The first platform 12 and second platform 14 may be secured to each other using one of straps, fasteners, or other various means of securing two structures to one another. Preferably the first platform 12 secured adjacent the second platform 14 form the backpack frame 60. The pack 58 is connected to the pack frame 60 with a plurality of straps 64. The shoulder straps 62 may be removable and connected to either the pack frame 60 or the pack 58.

Figure 12:
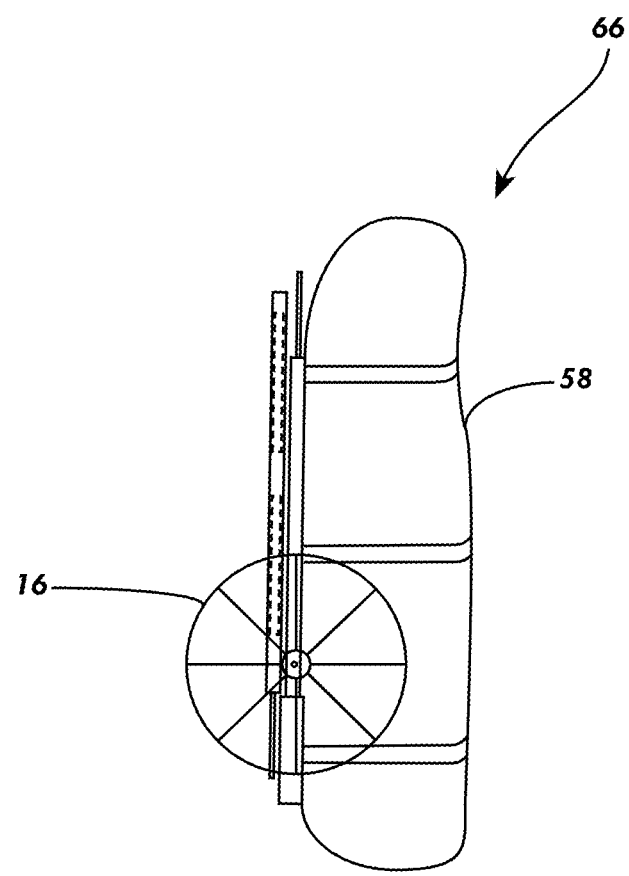

In another embodiment, the shoulder straps 62 of the pack 58 may be removed and the pair of wheels 16 secured to the first platform 12 with the pack 58 secured thereto to form a cart 66 for the pack 58, as illustrated in FIG. 12. Further, the second platform 14 may be removed and interlocked with the first platform 12 as disclosed above such that the second platform 14 may provide a handle for the user to transport the cart 66.

In yet another embodiment, when the first platform 12 and second platform 14 are interlocked, the two platforms may be substantially inverted such that the first platform 12 and second platform 14 form a shelter for the user. A tarp or other sheet-like material may be secured to the inverted first platform 12 and second platform 14 to create a barrier between the user and any weather elements. In one embodiment, the pack 58 may be substantially unfolded or otherwise opened such that the backpack 58 may form the tarp or barrier secured to the first platform 12 and second platform 14.

Figure 13:
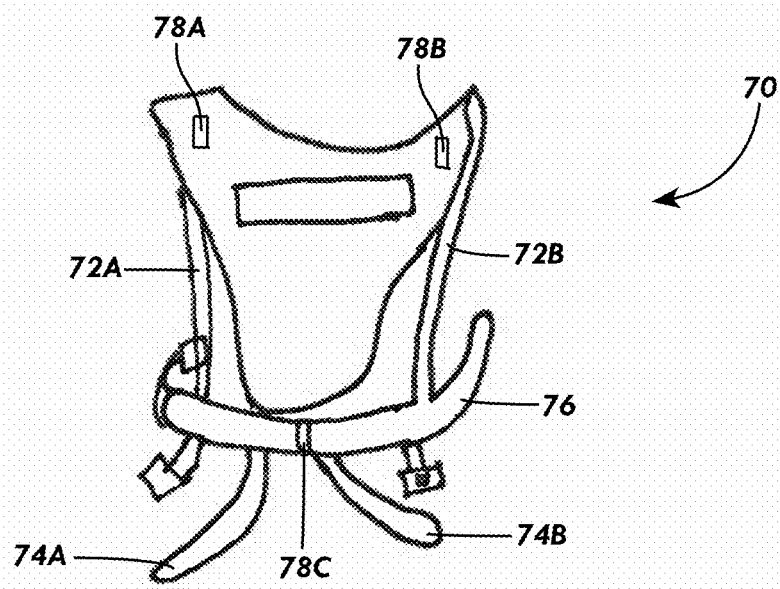
FIGS. 13 and 14 show a harness of a mobile hunting platform according to one embodiment of the present disclosure.
Figure 14:
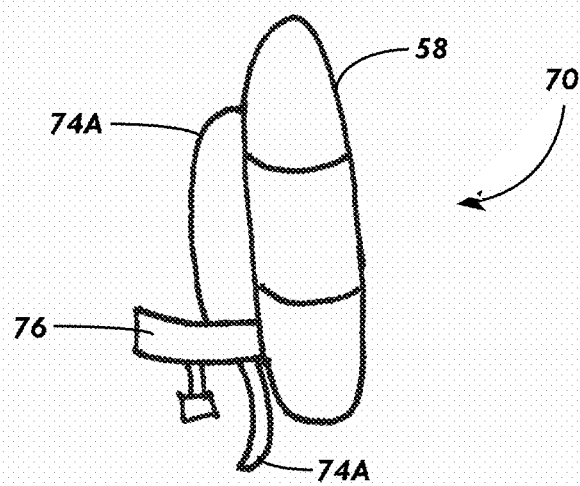

Referring now to FIGS. 13 and 14, in one embodiment the mobile hunting platform 10 includes a harness 70 for securing a user to a tree while the user is supported by the mobile hunting platform 10 to prevent a user from falling out of a tree engaged by the mobile hunting platform 10, the harness being configured to connect to the mobile hunting platform 10 when the mobile hunting platform 10 is configured as a pack 58. The harness 70 includes a pair of shoulder straps 72A and 72B, a pair of leg straps 74A and 74B, a belt 76, and a plurality of straps 78A, 78B, and 78C for connecting at least one of the first platform 12 or second platform 14 of the mobile hunting platform 10. The harness 70 enables a user to easily transport the mobile hunting platform 10 while also serving as a support for a user when the user is supported by the mobile hunting platform in a tree. Further, the harness 70 may include additional protection, such as armored plates secured to a front or back of the harness 70 when the mobile hunting platform 10 is used in a military environment.

The mobile hunting platform of the present disclosure advantageously provides a lightweight and reconfigurable hunting platform that is readily transportable by a user as a cart or backpack. The mobile hunting platform is also configured such that any additional components required to make the platform mobile are readily integrated into a structure of the mobile hunting platform such that the additional components do not interfere with use of the platform by the user.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A mobile hunting platform for supporting a user in a tree, the mobile hunting platform comprising:
    a pair of wheels removably connected to an axle, each of the pair of wheels including a hub, a rim, and a plurality of spokes extending radially from the hub to the rim, the hub and spokes configured to be walked upon by a user when the wheel is supported by the rim of the wheel;
    a first platform comprising
        a first platform frame,
        a first jaw connected to the first platform frame for engaging the trunk of a tree, and
        a floor structure connected to the first platform frame for supporting a user, the floor structure comprising:
            a floor surface having at least one circular cutout including an annular support rim formed therein, the cutout shaped to receive and support at least one of the pair of wheels within the cutout such that the hub and plurality of spokes of the wheel are positioned over the cutout and the rim of at least one of the wheels is supported by the annular support rim formed in the circular cutout; and
    a second seating platform comprising a second platform frame and a second jaw connected to the second platform frame for engaging a trunk of said tree;
    wherein in a first configuration of the mobile hunting platform the wheels are attached to the axle and the second platform is joined to the first platform to substantially form a mobile cart for transporting the mobile platform;
    wherein in a second configuration of the mobile hunting platform the first platform and second platform are separated from each other and attached to a tree, and at least one of the pair of wheels is removed from the axle and placed within the circular cutout of the floor structure such that the hub and plurality of spokes of the wheel and the floor structure together form a platform surface.

2. The mobile hunting platform of claim 1, wherein the axle is connected to the second platform.

3. The mobile hunting platform of claim 2, wherein the second platform further comprises a tray connected to the second platform frame at a distal end of the second platform relative to the second jaw.

4. The mobile hunting platform of claim 3, wherein the tray includes an edge such that a gap is created between the edge of the tray and the axle connected to the second platform.

5. The mobile hunting platform of claim 4, wherein the gap between the edge of the tray and the axle is sized to receive the first jaw wherein the first jaw engages the gap of the second platform to substantially interlock the first platform and second platform together.

6. The mobile hunting platform of claim 1, wherein the first platform and the second platform are interlocked such that the first platform and second platform are connected to each other when the mobile hunting platform is in the first configuration to form a cart.

7. The mobile hunting platform of claim 1, wherein a second wheel of the pair of wheels is horizontally secured to the second platform to substantially form a seat for supporting a user.

8. The mobile hunting platform of claim 1, wherein the first platform further comprises a first platform cable connected to the first platform frame and configured to substantially contact the tree such that the first platform cable and first jaw engage the tree for supporting the first platform in the tree.

9. The mobile hunting platform of claim 1 further comprising a tether secured to the first platform at a first end and the second platform at a second end for securing the first platform and second platform together.

10. The mobile hunting platform of claim 1 further comprising a pack, wherein the pack is sized to receive the first platform and second platform, the pack further comprising a pair of shoulder straps for engaging a user's shoulders such that the user may carry the mobile hunting apparatus as a backpack.

11. The mobile hunting platform of claim 1 further comprising a harness, the harness including a pair of shoulder straps and a pair of leg straps for supporting a user while a user is supported by the mobile hunting platform.

12. The mobile hunting platform of claim 11 wherein the harness further includes a plurality of straps for engaging the mobile hunting platform when the mobile hunting platform is configured as a pack.

13. A mobile hunting platform for supporting a user in a tree, the mobile hunting platform comprising:
    a pair of wheels removably connected to an axle, each of the pair of wheels including a hub, a rim, and a plurality of spokes extending radially from the hub to the rim, the hub and spokes configured to be walked upon by a user when the wheel is supported by the rim of the wheel;
    a first platform comprising a first platform frame, a first jaw secured to the first platform for engaging the trunk of the tree, and a floor structure for supporting a user, the floor structure comprising:
        a floor surface having at least one cutout including a support rim formed therein, the cutout shaped to receive and support at least one of the pair of wheels within the cutout such that the hub and plurality of spokes of the wheel are positioned over the cutout and supported by the support rim
    a second platform comprising a second platform frame, a second jaw connected to the second platform for engaging a trunk of the tree, the second platform further comprising a tray connected to the second platform frame at a distal end of the second platform relative to the second jaw;
    wherein the axle is connected to the second platform adjacent the tray such that a gap is formed between an edge of the tray and the axle;
    wherein in a first configuration of the mobile hunting platform the wheels are attached to the axle and the second platform is joined to the first platform to substantially form a mobile cart for transporting the mobile platform;
    wherein in a second configuration of the mobile hunting platform the first platform and second platform are separated from each other and attached to a tree, and at least one of the pair of wheels is removed from the axle and placed within the cutout of the floor structure such that the hub and plurality of spokes of the wheel and the floor structure together form a platform.

14. A method of converting a mobile hunting platform between a climbing tree stand to a cart, the method comprising:
    providing a climbing tree stand comprising a first platform and a second platform, each of the first platform and second platform including a jaw and a platform frame, the first platform including a floor structure having a floor surface including at least one cutout having a support rim formed therein, the cutout shaped to receive and support at least one of the pair of wheels with the support rim of the cutout such that the hub and plurality of spokes of the wheel are positioned over the cutout;
    providing a pair of wheels within the cutout of the floor structure of the first platform, each of the pair of wheels having a hub, a rim, and a plurality of spokes extending radially from the hub to the rim, the hub spokes such that the hub and spokes of the wheels are positioned over the cutout such that the hub and spokes and the floor structure together are configured to be walked upon by a user when the mobile hunting platform is in a tree stand configuration;
    inserting the jaw of the first platform into a into a portion of the second platform such that the first platform and second platform are substantially interlocked; and
    removing the pair of wheels from the cutout of the floor structure of the first platform and securing the pair of wheels to an axle of the mobile hunting platform such that the mobile hunting platform is substantially configured as a cart.

15. The method of claim 14 wherein the jaw of the first platform is inserted into a gap between an edge of a tray of the second platform and the axle secured to the second platform.

* * * * *